(12) United States Patent
Ito et al.

(10) Patent No.: US 11,822,836 B2
(45) Date of Patent: Nov. 21, 2023

(54) NON-TRANSITORY COMPUTER-READABLE RECORDING MEDIUM FOR PURCHASING CONSUMABLES

(71) Applicant: BROTHER KOGYO KABUSHIKI KAISHA, Nagoya (JP)

(72) Inventors: Fuyuko Ito, Nagoya (JP); Satoki Nagao, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/935,104

(22) Filed: Sep. 25, 2022

(65) Prior Publication Data
US 2023/0111708 A1 Apr. 13, 2023

(30) Foreign Application Priority Data
Sep. 28, 2021 (JP) .................... 2021-158107

(51) Int. Cl.
G06F 3/12 (2006.01)
G06Q 20/32 (2012.01)

(52) U.S. Cl.
CPC .......... *G06F 3/1229* (2013.01); *G06F 3/1208* (2013.01); *G06F 3/1255* (2013.01); *G06F 3/1256* (2013.01); *G06Q 20/3267* (2020.05); *G06F 3/1204* (2013.01)

(58) Field of Classification Search
CPC .... G06F 3/1229; G06F 3/1208; G06F 3/1255; G06F 3/1256; G06Q 20/3267
USPC ....................................................... 358/1.15
See application file for complete search history.

(56) References Cited

U.S. PATENT DOCUMENTS

2003/0059221 A1* 3/2003 Funahashi .......... G03G 15/5079
399/8
2008/0015944 A1* 1/2008 Nose .................. G06Q 30/0601
705/26.1

FOREIGN PATENT DOCUMENTS

JP 2003-85463 A 3/2003

* cited by examiner

*Primary Examiner* — Darryl V Dottin
(74) *Attorney, Agent, or Firm* — KENEALY VAIDYA LLP (57) ABSTRACT

A device is configured to obtain startup information of a consumable purchasing program, and download and start up the consumable purchasing program. The consumable purchasing program obtains printer information indicating a printer to be used by the device from a printing application. The consumable purchasing program check the printer information obtained from the printing application against consumables database, generate a list of the consumables compatible with the printer, and display a purchase procedure screen configured to receive a purchasing instruction to purchase a consumable included in the list. The consumable purchasing program performs a purchase procedure of the consumable when receiving the purchasing instruction through the purchase screen.

12 Claims, 10 Drawing Sheets

| CONSUMABLE INFORMATION | MODEL INFORMATION |
|---|---|
| LABEL A | ・xxx-xx1<br>・xxx-xx2<br>・xxx-xx3 |
| LABEL B | ・xxx-xx4<br>・xxx-xx5 |
| LABEL C | ・xxx-xx6<br>・xxx-xx7<br>・xxx-xx1 |
| LABEL D | ・xxx-xx1<br>・xxx-xx8 |
| CLEANING SHEET K | ・xxx-xx7<br>・xxx-xx1 |
| CLEANING SHEET L | ・xxx-xx4 |
| REPLACEMENT CUTTER P | ・xxx-xx1 |
| BATTERY R | ・xxx-xx4 |

NON-TRANSITORY COMPUTER-READABLE RECORDING MEDIUM FOR PURCHASING CONSUMABLES

REFERENCE TO RELATED APPLICATIONS

This application claims priority from Japanese Patent Application No. 2021-158107 filed on Sep. 28, 2021. The entire content of the priority application is incorporated herein by reference.

BACKGROUND ART

The present disclosures relate to a non-transitory computer-readable recording medium containing instructions realizing a program that is used to purchase consumables for a printer.

Conventionally, there has been known technology related to online purchasing systems for printer consumables, such as ink and toner cartridges and sheets. For example, there is known a configuration that uses electronic money to make payments for consumable purchases over the Internet.

DESCRIPTION

When one purchases consumables for his or her own printer online, when the purchaser searches for the consumables on the Internet, some similar products or products offered by different companies may be found. As a result, it is difficult for the purchaser to know which consumables are compatible with which printers, and the purchaser may end up purchasing consumables that are not compatible with the printer he or she owns.

According to aspects of the present disclosure, there is provided a non-transitory computer-readable storage medium for a device having a computer. The non-transitory computer-readable storage medium contains computer-executable instructions realizing a consumable purchasing program used to purchase consumables. The consumable purchasing program is a program providing part of functions of a full application. The consumable purchasing program is a program that does not require installation on the device. The consumable purchasing program is erased from the device after a predetermined amount of time has elapsed. The consumable purchasing program is to be downloaded to the device and started up by the device reading startup information of the consumable purchasing program. The full application is a program that requires installation on the device. The consumable purchasing program causes, when executed by the computer, the device to perform a printer information obtaining process of obtaining printer information of a printer used by the device, the printer information being information usable by an other program different from the consumable purchasing program, the printer information being shared by the other program and the consumable purchasing program, a list obtaining process of obtaining a list of consumables compatible with a printer indicated by the printer information obtained in the printer information obtaining process, and a purchasing process of receiving a purchasing instruction to purchase a consumable included in the list of consumables and performing a purchase procedure of the consumable when receiving the purchasing instruction.

Further, according to aspects of the present disclosure, there is provided a non-transitory computer-readable storage medium for a device having a computer. The non-transitory computer-readable storage medium contains computer-executable instructions realizing a consumable purchasing program used to purchase consumables. The consumable purchasing program is a program providing part of functions of a full application. The consumable purchasing program being a program that does not require installation on the device. The consumable purchasing program is erased from the device after a predetermined amount of time has elapsed, the consumable purchasing program being to be downloaded to the device and started up by the device reading startup information of the consumable purchasing program, the full application being a program that requires installation on the device, a parameter indicating identifying information is assignable to the startup information, the identifying information identifying a consumable. The consumable purchasing program causes, when executed by the computer, the device to perform a specific purchasing process of determining, when a parameter indicating the identifying information is assignable to the startup information, whether the consumable identified by the identifying information that the parameter is assigned is compatible with the printer indicated by the obtained printer information, receiving the purchasing instruction to purchase the consumable identified by the identifying information when the consumable is compatible with the printer indicated by the obtained printer information, executing the purchasing process when receiving the purchasing instruction, and notifying that the consumable is not compatible with the printer when the consumable is not compatible with the printer indicated by the obtained printer information.

Hereinafter, a program realized by computer-executable instructions contained in a non-transitory computer-readable recording medium will be described with reference to the accompanying drawings. Embodiments described below are related to an application program (hereinafter, also referred to as an "app") downloaded to a device having a communication function and used to purchase consumables for a printer online.

First Embodiment

Configuration of Mobile Terminal

Figure 1:
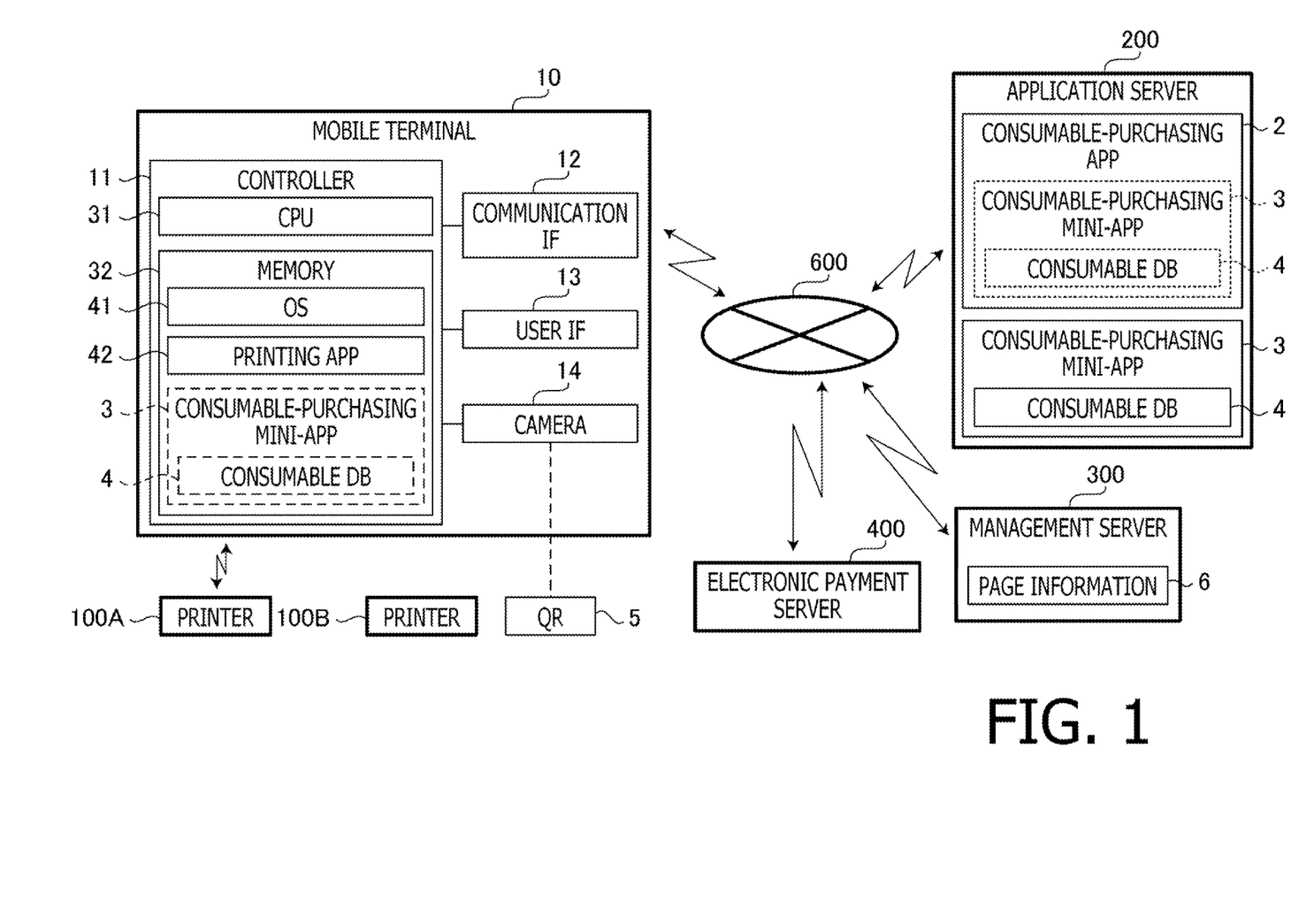
FIG. 1 is a block diagram illustrating a configuration of a mobile terminal that is configured to execute a consumable-purchasing mini-app according to a first embodiment of the present disclosures.

FIG. 1 is a block diagram showing a configuration of a consumable-purchasing system including a mobile terminal 10 which is configured to execute a consumable-purchasing mini-app 3 according to a first embodiment of the present disclosures. The mobile terminal 10 is a portable information processing device such as a smartphone, a tablet terminal, a mobile PC, or the like. The mobile terminal 10 is configured to be communicatively connected to an application server 200, a management server 300 and an electronic payment server 400 via a WAN (Wide Area Network) 600. Further, the mobile terminal 10 is further configured to be communicatively connected to a printer 100A and a printer 100B. The application server 200, the management server 300, the electronic payment server 400, the printer 100A and the printer 100B will be described later.

The mobile terminal 10 has a controller 11 including a CPU 31 and a memory 32. The mobile terminal 10 further has a communication interface (hereinafter "interface" being abbreviated as "IF") 12, a user IF 13, and a camera 14, which are electrically connected to the controller 11. It is noted that the term "controller 11" is used as a collective term including both software and hardware used to control the mobile terminal 10.

The communication IF 12 includes hardware used to communicate with an external device. A communication method employed in the communication IF 12 may be either a wireless method or a wired method. Specifically, the communication method may be of any standard such as Wi-Fi (registered trademark of Wi-Fi Alliance), LAN (Local Area Network), or the like. Alternatively, the communication method may be one directly communicating with an external device such as Bluetooth (registered trademark of Bluetooth SIG), USB (Universal Serial Bus), or NFC (Near Field Communication).

The user IF 13 of the mobile terminal 10 is, for example, a touch panel, which has a displaying function to display various information and an operation function to receive data input. It is noted that the user IF 13 may have an operation device such as a keyboard and a mouth and a displaying device such as an LCD, separately. The camera 14 has a function to scan an image (e.g., to take a picture of the image).

The memory 32 includes a volatile memory area and a non-volatile memory area. The memory 32 stores various programs including an operating system (OS) 41 and a printing application (hereinafter also referred to as a "printing app") 42. Applications downloaded from the application server 200 are also stored in the memory 32. Further, various pieces of data are stored in the memory 32. The memory 32 is also used as a work area when various processes are executed, or as a storage area for temporarily storing data. The CPU 31 executes various processes according to programs read from the memory 32. It is noted that the CPU 31 is an example of a "computer." Alternatively, the controller 11 may be an example of the "computer."

The OS 41 is software configured to control operations of the mobile terminal 10. The OS 41 is configured to manage the various programs such as the printing app 42 and the consumable-purchasing mini-app 3, which are downloaded to the mobile terminal 10. The OS 41 is, for example, the iOS (registered trademark of Apple Inc.), or Android (registered trademark of Google LCC.). When the mobile terminal 10 is a PC (personal computer), the OS may be one of Windows (registered trademark of Microsoft Corporation), macOS (registered trademark of Apple Inc.), and Linux (registered trademark of Linux Mark Institute).

The printing app 42 is a program configured to control a printer. The printing app 42 is an example of "another program." The printing app 42 is provided by a manufacturer of a printer. The printing app 42 is compatible with multiple printer models. Information on the printer (hereinafter referred to as printer information) to be used is registered in the printing app 42. The printer information includes, for example, specific connection information for connecting to the printer, such as an SSID or an IP address, and model information indicating the model of the printer. The printing app 42 may additionally be equipped with functions for editing and saving images.

Configurations of Printer 100A and Printer 100B

Printers 100A and 100B have at least printing and communication functions. The printers 100A and 100B in the present embodiment are label writers that produce labels by printing on a printing tape, which is a printing medium, by melting an ink ribbon with heat and transferring the melted ink on the printing tape (i.e., in accordance with a thermal transfer method). The printers 100A and 100B are of different models and are assigned the model information "xxx-xx1" and "xxx-xx4," respectively.

The printers 100A and 100B are configured such that functions and usable consumables are different for different models. The consumables are, for example, tape cartridges, sheets, replacement cutters for cutting tapes, and rechargeable batteries.

For example, the tape cartridge is a consumable that contains a continuous strip of wound printing tape and a continuous strip of wound ink ribbon, and the printing tape or ink ribbon cannot be replaced individually. A wide variety of tape cartridges exist that contain a combination of a printed tape with different tape widths, tape colors, tape patterns, tape materials (paper, cloth, with or without seals, with or without gloss, with or without lamination, and the like), and an ink ribbon with different ink colors. To each tape cartridge, consumable information indicating the cartridge type is assigned, for example, "Label A," "Label B," "Label C," or "Label D." The printers 100A and 100B can generate labels with different tape widths, tape ground colors, and text colors by replacing the tape cartridges. On the other hand, the tape cartridges have different shapes depending on the tape width and other factors. Therefore, tape cartridges that do not correspond to the models of the printer 100A or 100B cannot be installed thereto.

Configuration of Application Server 200

The application server 200 is installed on the WAN 600 by an entity that provides an application download service (e.g., Apple (registered trademark) Inc. or Google (registered trademark) Inc.). The application server 200 is a server that delivers applications designated by a user of a mobile terminal to that mobile terminal. In the application server 200, a consumable-purchasing app 2 and the consumable-purchasing mini-app 3 are stored for purchasing consumables.

The consumable-purchasing mini-app 3 is a mini-app that has some of the functions of the consumable-purchasing app 2, and is configured to simply provide a user with some of the functions of the consumable-purchasing app 2. The "mini-app" is an application program that has some of the functions of an application program that must be installed on the device (also called a "full application"), but does not require installation on the device. Since no installation is required, the device can run the mini-app even if the installation of a program is restricted. The mini-app is small-size programs and can be downloaded in a shorter amount of time compared to full applications. The mini-app is automatically erased by the OS after they have been downloaded, for example, after a predetermined amount of time has elapsed, so the memory load is small. Further, information entered into the mini-app is highly secure because it does not remain in the memory due to the erasure of the mini-app. By downloading the mini-app in a situation of need, the user can use some of the features of the full application without having to download and install the full application.

An Example of the mini-app are AppClips (a program that runs on iOS) or InstantApps (a program that runs on Android). In the present embodiment, the consumable-purchasing app 2 is an example of a "full app" and the consumable-purchasing mini-app 3 is an example of a "mini-app" that corresponds to the consumable-purchasing app 2. Concretely, the consumable-purchasing mini-app 3 according to the present embodiment has, among the functions possessed by the consumable-purchasing app 2 that is the full application, a function of obtaining printer information indicating a printer to be used by devices such as a mobile terminal, a list generating function of generating a consumable list indicating consumables corresponding to the printer indicated by the obtained printer information, a screen displaying function of displaying a purchase procedure screen for receiving purchase instructions regarding consumables included in the consumable list, and a purchasing function to receive the purchase instructions via the purchase procedure screen and purchase the consumables.

Figure 2:
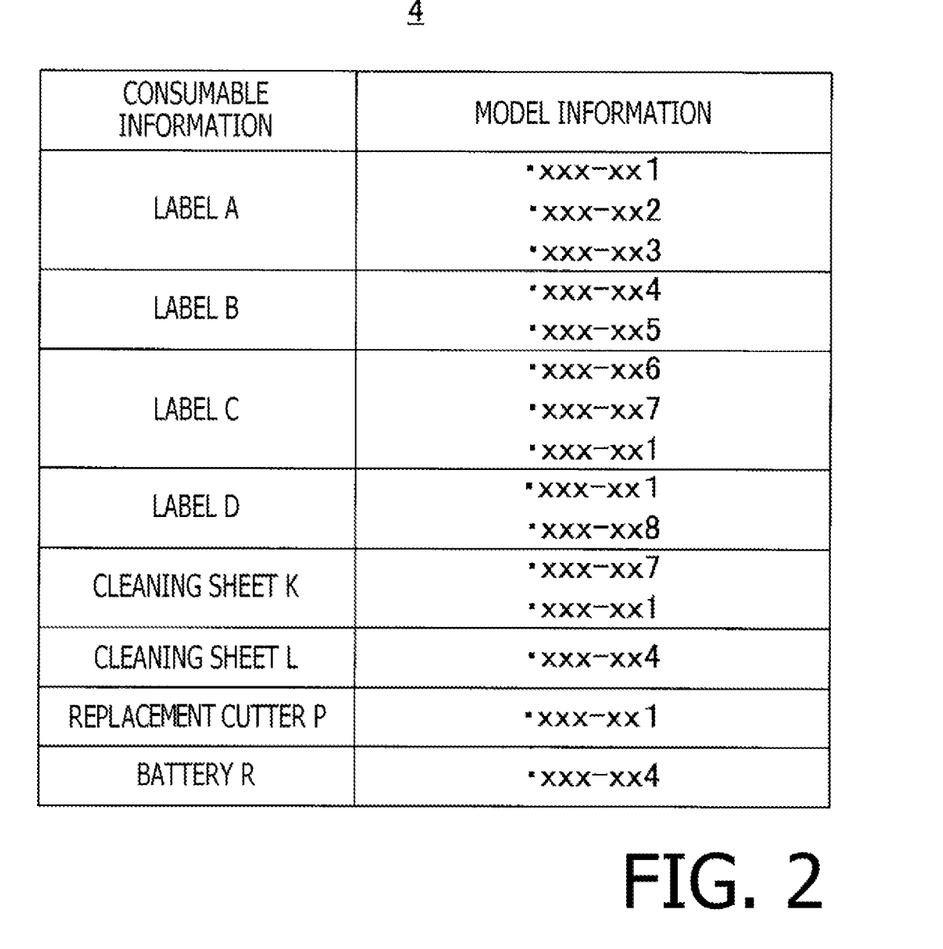
FIG. 2 shows an example of a consumable database.

The consumable-purchasing mini-app 3 has a consumable database (hereinafter a database is also referred to as "DB") 4, to realize a list generating function. FIG. 2 shows an example of a consumable DB 4. The consumable DB 4 stores consumable information that indicates consumables in association with model information that indicates printer models corresponding to the consumables. For example, "Label A," "Label B," "Label C," and "Label D" are tape cartridges with different tape widths, tape colors and print colors. The "Label A" is associated with the model information "xxx-xx1," "xxx-xx2," and "xxx-xx3," and the tape cartridge of "Label A" is compatible with a printer of the model indicated by the model information.

Returning to FIG. 1, when downloaded and activated on the mobile terminal 10, the consumable-purchasing mini-app 3 performs the purchase procedure in response to a user operation. In other words, the user can actually experience some of the functions of the consumable-purchasing app 2. Thus, the user (purchaser of consumables) can try the consumable-purchasing mini-app 3 before installing the full app, the consumable-purchasing app 2, and then the user can decide whether or not to download consumable-purchasing app 2 based on the results of that trial. When the consumable-purchasing app 2 is installed while the consumable-purchasing mini-app 3 is stored, the already stored consumable-purchasing mini-app 3 is incorporated into the consumable-purchasing app 2 as it is, or erased (i.e., replaced with the consumable-purchasing mini-app 3 included in the consumable-purchasing app 2). After a particular amount of time has elapsed since the consumable-purchasing mini-app 3 was downloaded, the OS 41 automatically erases the consumable-purchasing mini-app 3 from the memory 32 of the mobile terminal 10.

Returning to FIG. 1, a QR code (registered trademark of Denso Wave Incorporated) 5 containing startup information for the consumable-purchasing mini-app 3 is attached to each consumable body, each consumable packaging, each printer body, and each printer body packaging. Mobile terminal 10 can obtain startup information by reading the QR code 5 by the camera 14. The startup information includes, for example, a URL for downloading a consumable-purchasing mini-app 3 from the application server 200. When the mobile terminal 10 obtains the startup information for the consumable-purchasing mini-app 3, the mobile terminal 10 accesses the application server 200 based on the URL contained in the startup information, downloads the consumable-purchasing mini-app 3, and starts the same.

The startup information may be contained in a Near Field Communication (NFC) tag attached to the consumable, the printer body itself or its packaging. The mobile terminal 10 may read the startup information passed through notification from the assistant function of the OS 41 (e.g., Siri or Google Assistant) or other means.

In addition to the functions possessed by the consumable-purchasing mini-app 3, the consumable-purchasing app 2 has guidance functions for printers in general, such as the management of purchase history and the introduction of models. That is, the consumable-purchasing app 2 has all the functions that the consumable-purchasing mini-app 3 has and is equipped with a consumable DB 4. In order for execution of the consumable-purchasing app 2, installation of the consumable-purchasing app 2 is required. Thus, after installation on the mobile terminal 10, the consumable-purchasing app 2 remains on the mobile terminal 10 until it is uninstalled.

Configuration of Management Server

The management server 300 is located on the WAN 600 by the printer manufacturer that produces the printer. The management server 300 manages printer consumables provided by the regular printer manufacturer. The management server 300 stores page information 6 used by the consumable-purchasing mini-app 3 to display the purchase procedure screen. The page information 6 includes, for example, a page layout. When receiving the consumable-purchasing list generated by the consumable-purchasing mini-app 3 from the mobile terminal 10, the management server 300 has the function of transmitting the page information 6 corresponding to the list to the mobile terminal 10.

Configuration of Electronic Payment Server

The electronic payment server 400 is installed on the WAN 600 by an entity that provides an online payment service. In the present embodiment, the electronic payment server 400 is used to pay for purchasing consumables using the consumable-purchasing mini-app 3.

Operations

Figure 3:
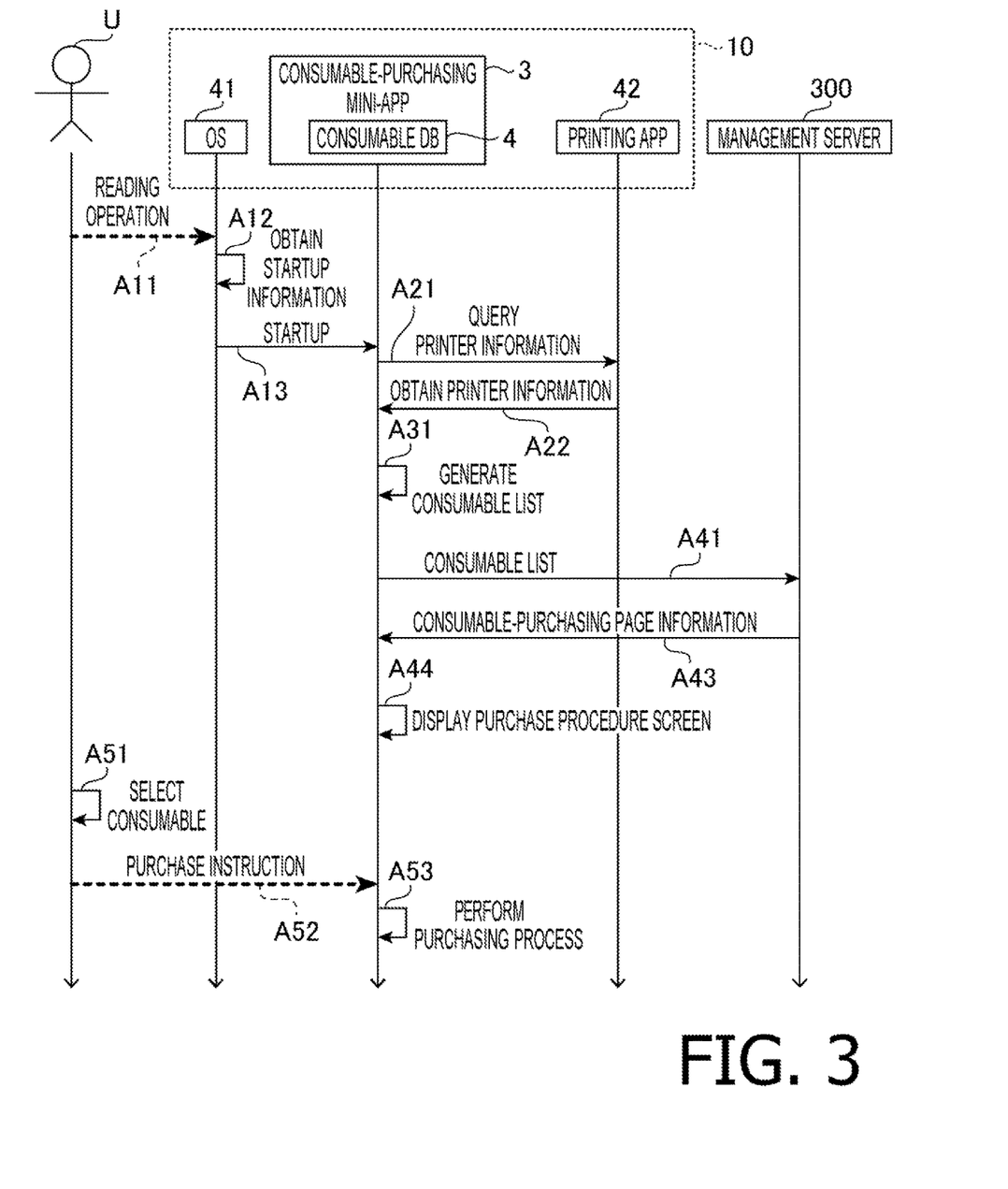
FIG. 3 is a sequence chart illustrating a control procedure of a consumable-purchasing process.

Hereinafter, operations for purchasing consumables using the consumable-purchasing mini-app 3 will be described. FIG. 3 is a sequence diagram showing a control procedure for the consumables purchasing process. Although each process performed by the mobile terminal 10 is controlled by the CPU 31, in the following, the entities that perform each process will be referred to as the mobile terminal 10, the OS 41, and the consumable-purchasing mini-app 3, and the printing app 42. In the following example, a case where the QR code 5 attached to a consumable such as a tape cartridge or a printer is read by the mobile terminal 10 and the consumable such as the tape cartridge or the printer is purchased online will be described.

Firstly, a purchaser U uses the camera 14 of the mobile terminal 10 to read the QR code 5 attached, for example, to the tape cartridge (arrow A11). The OS 41 obtains startup information of the consumable-purchasing mini-app 3 from the QR code 5 read by the camera 14 (arrow A12) and starts the consumable-purchasing mini-app 3 (arrow A13).

If the consumable-purchasing mini-app 3 has not been downloaded to the mobile terminal 10 when the OS 41 obtains the startup information, the OS 41 accesses the application server 200 via the communication IF 12 based on the URL included in the startup information, downloads the consumable-purchasing mini-app 3 to the mobile terminal 10, and launches the same. On the other hand, if the consumable-purchasing mini-app 3 has already been downloaded to the mobile terminal 10, the OS 41 does not access the application server 200 and launches the consumable-purchasing mini-app 3 which has already been downloaded to the mobile terminal If the consumable-purchasing app 2 has already been installed, the OS 41 launches the consumable-purchasing app 2 instead of the consumable-purchasing mini-app 3.

The consumable-purchasing mini-app 3 and the printing app 42 are provided by the same printer manufacturer and can share information. Therefore, the consumable-purchasing mini-app 3 searches for the printing app 42 and queries the searched printing app 42 for printer information (arrow A21). If, for example, printer information indicating the printer 100A is registered in the printing app 42 itself, the printing app 42 passes the printer information to the consumable-purchasing mini-app 3 (arrow A22). In this way, the printer information for the printer 100A is shared between the consumable-purchasing mini-app 3 and the printing app 42. The processes indicated by arrows A21 to A22 are examples of a "printer information obtaining process."

Having obtained the printer information, the consumable-purchasing mini-app 3 generates a consumable list, which corresponds to the model of the printer 100A (arrow A31). Concretely, when the consumable-purchasing mini-app 3 obtains the printer information of the printer 100A (arrow A22), the consumable-purchasing mini-app 3 checks the model information "xxxx-xx1" of the printer 100A included in the printer information against the consumable DB 4 shown in FIG. 2 and retrieves the consumable information "Label A," "Label B," "Label C,""Label D," "Cleaning Sheet K," and "Replacement Cutter P" which are associated with the model information "xxx-xx1." Then, the consumable-purchasing mini-app 3 generates a list containing the retrieved information indicating the consumables. The process indicated by arrow A31 is an example of a "list obtaining process."

Returning to FIG. 3, the consumable-purchasing mini-app 3 transmits, via the communication IF 12, the generated consumable list to the management server 300 (arrow A41). The management server 300 extracts the page information 6 corresponding to the consumables "Label A," "Label D," "Cleaning Sheet K," and "Replacement Cutter P" contained in the received consumable list and transmits them to the consumable-purchasing mini-app 3 (arrow A43).

Figure 4:
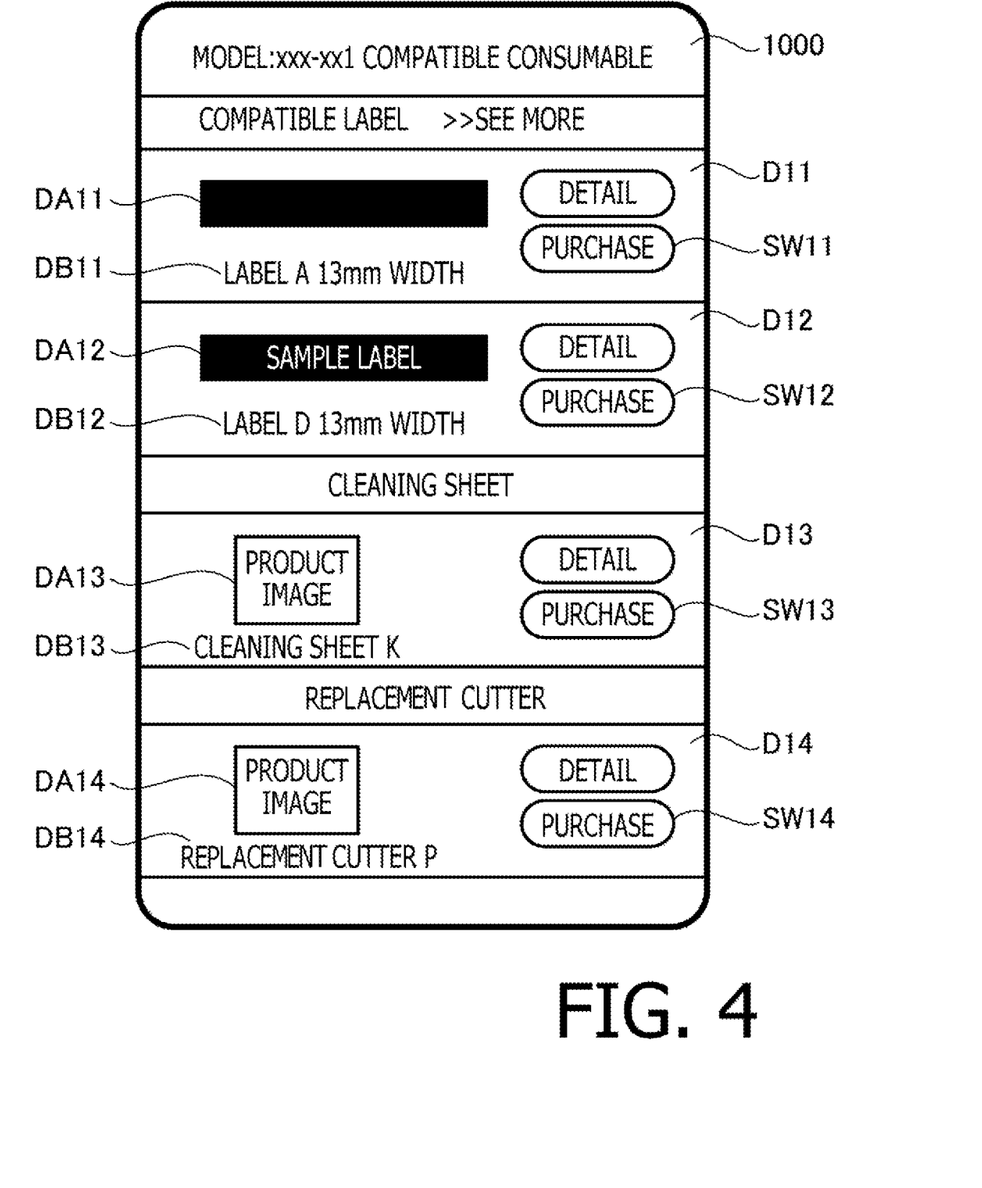
FIG. 4 shows an example of a purchase procedure screen displayed on the mobile terminal.

When the consumable-purchasing mini-app 3 receives the page information 6 from the management server 300 via the communication IF 12, the consumable-purchasing mini-app 3 displays a purchase procedure screen 1000, based on the page information 6, via the user IF 13 (arrow A44). FIG. 4 shows an example of the purchase procedure screen 1000. The purchase procedure screen 1000 is configured such that the display fields D11, D12, D13, D14, and the sample images DA11, DA12, DA13, DA14, and product summary descriptions DB11, DB12, DB13, DB14, and purchase buttons SW11, SW12, SW13, SW14 for receiving purchase instructions are displayed. Since the information displayed on the purchase procedure screen 1000 is provided by the printer manufacturer, only the regular consumables are displayed on the purchase procedure screen 1000.

Returning to FIG. 3, when the purchaser U operates, for example, the purchase button SW11 shown in FIG. 4 and selects "Label A" (arrow A51), the consumable-purchasing mini-app 3 receives a purchase instruction to purchase label A (arrow A52) and performs the purchasing process (arrow A53). For example, the consumable-purchasing mini-app 3 may transmit the user information registered in the consumable-purchasing mini-app 3 itself or in the OS 41 and the consumable information indicating label A to the electronic payment server 400 via the communication IF 12 and make a payment online. The processes indicated by arrows A41 through A44 and arrows A51 through A53 are examples of a "purchasing process."

It is noted that the consumable-purchasing mini-app 3 may be configured to prompt the user to install the consumable-purchasing app 2 corresponding to the consumable-purchasing mini-app 3 when a purchasing instruction is received or after payment is made. There is a case where the purchaser U repeatedly purchases the same consumables, the convenience of consumable purchasing is expected to be improved by installing the consumable-purchasing app 2 which can manage the purchase history of the purchaser U.

As explained above, the mobile terminal 10, on which the consumable-purchasing mini-app 3 of the present embodiment is downloaded, obtains the printer information (the model information) to be shared with the printing app 42 by the consumable-purchasing mini-app 3 (arrow A21 to A22). This printer information is likely to be the information indicating the printer 100A owned by the purchaser U. The mobile terminal 10 then generates a consumable list compatible with the model of the printer 100A indicated in the printer information (model information) by means of the consumable-purchasing mini-app 3 and receives purchase instructions for the consumables indicated in that consumable list via the purchase procedure screen 1000. In this way, the mobile terminal 10 is more likely to allow the purchaser U to select the appropriate consumables for the printer 100A that the purchaser owns at the time of purchasing the consumables, thereby reducing a situation where the purchaser U is confused about the selection of consumables.

Second Embodiment

Figure 5:
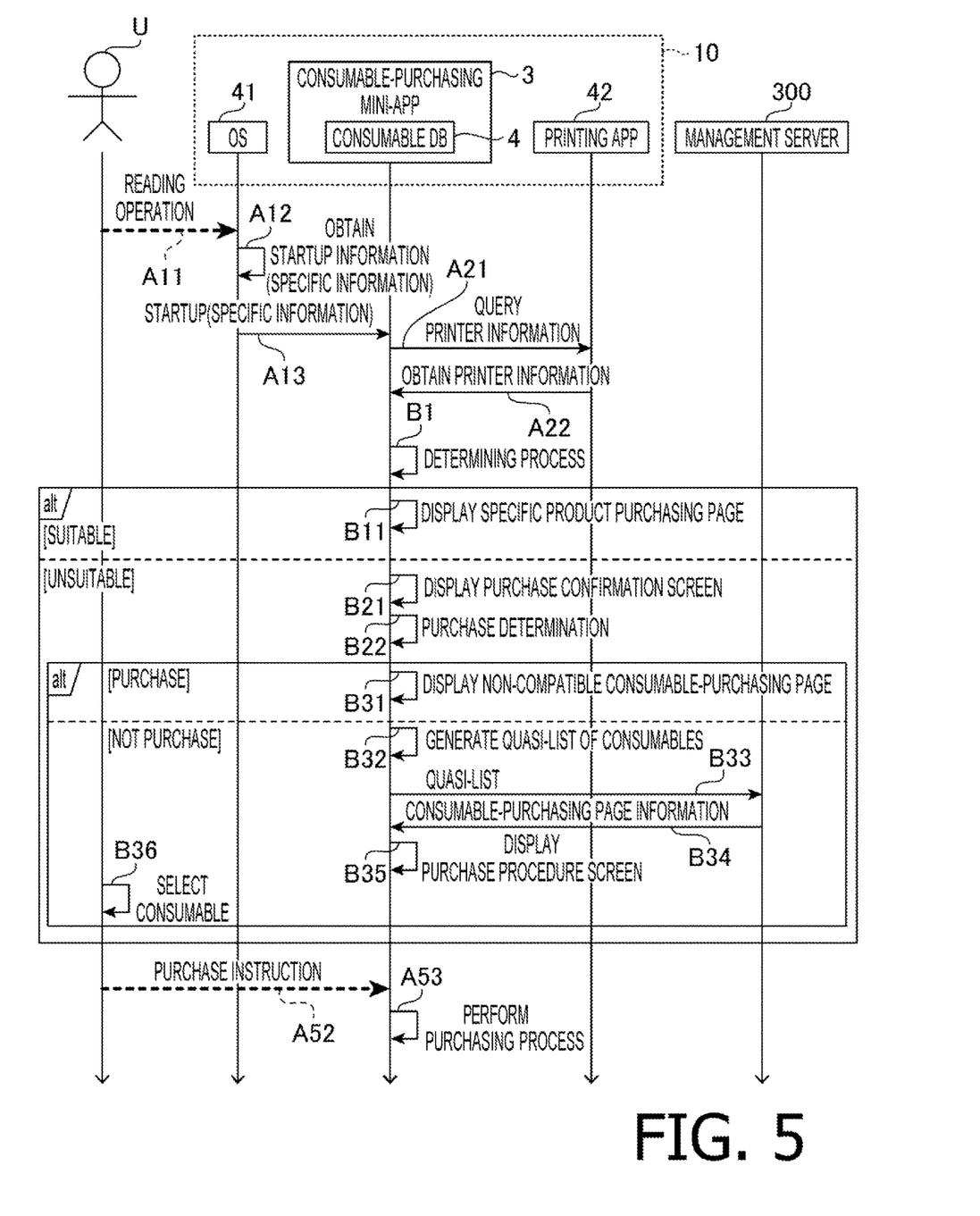
FIG. 5 is a sequence chart illustrating a control procedure of a consumable-purchasing process when purchasing consumables using a consumable-purchasing mini-app according to a second embodiment.

Next, a program according to a second embodiment which is realized by computer-executable instructions contained in the memory 32 which is an example of a non-transitory computer-readable recording medium will be described. FIG. 5 is a sequence diagram showing a control procedure of a consumable purchasing process for purchasing consumables using the consumable-purchasing mini-app 3 according to the second embodiment. The present embodiment differs from the first embodiment in that the startup information included in the QR code 5 has a parameter indicating identifying information that identifies consumable, and the consumable-purchasing mini-app 3 determines whether the consumable identified by the identifying information compatible with the printer indicated by the printer information obtained from the printing app 42 or the like. In the following, the description will focus on the configuration that differs from the first embodiment, and the same symbols as in the first embodiment will be used for configurations that are common to the first embodiment, and descriptions will be omitted as appropriate.

The mobile terminal 10 is configured such that, for example, when the QR code 5 on a tape cartridge is scanned by the camera 14, the OS 41 obtains the startup information contained in the QR code 5 and starts the consumable-purchasing mini-app 3 (arrows A11 to A13). Since the startup information in the present embodiment has a parameter indicating identifying information that identifies the consumable (e.g., consumable information indicating a tape cartridge with "Label A"), the OS 41 passes the identifying information assigned to the startup information to the consumable-purchasing mini-app 3 (arrow A13).

When obtaining, for example, the printer information containing the model information "xxx-xxx2" of the printer 100A from the printing app 42 (arrows A21 to A22), the launched consumable-purchasing mini-app 3 performs a determining process (arrow B1). In the determining process, whether a consumable identified by the identifying information is suitable to the printer indicated by the printer information obtained in the process indicated by arrow A22.

For example, assuming that a parameter of the identifying information that identifies the tape cartridge with "Label A" is assigned to the startup information obtained by the consumable-purchasing mini-app 3. Then, it is further assumed that the consumable-purchasing mini-app 3 obtains the model information of the printer 100A including the model information "xxx-xxx1" of the printer 100A from the printing app 42. In the consumable DB 4 shown in FIG. 2, "Label A" is associated with the model information "xxx-xx1" of the printer 100A.

In this case, as shown in FIG. 5, the consumable-purchasing mini-app 3 determines that the tape cartridge with "Label A" identified by the identifying information in the determining process (arrow B1) is suitable for the printer 100A indicated by the obtained printer information (alt: suitable). In this case, the consumable-purchasing mini-app 3 displays, on the user IF 13, a specific product purchasing page that receives purchase instructions to purchase a tape cartridge with "Label A" (B11).

On the other hand, as another example, it is assumed that a parameter of identifying information that identifies the tape cartridge with "Label B" is assigned to the startup information obtained by the consumable-purchasing mini-app 3. In addition, it is also assumed that the consumable-purchasing mini-app 3 obtains the printer information including the model information "xxx-xxx1" of the printer 100A from the printing app 42. In the consumable DB 4 shown in FIG. 2, "Label B" is not associated with the model information "xxx-xx1" of the printer 100A.

In this case, as shown in FIG. 5, the consumable-purchasing mini-app 3 determines, in the determining process of arrow B1, that the tape cartridge of "Label B" identified by the identifying information is not suitable for the printer 100A indicated by the printer information (alt: unsuitable). In this case, the consumable-purchasing mini-app 3 displays a purchase confirmation screen 2000 via the user IF 13 (arrow B21) and allows the user to determine whether to purchase consumables that are not suitable for the printer 100A (arrow B22).

Figure 6:
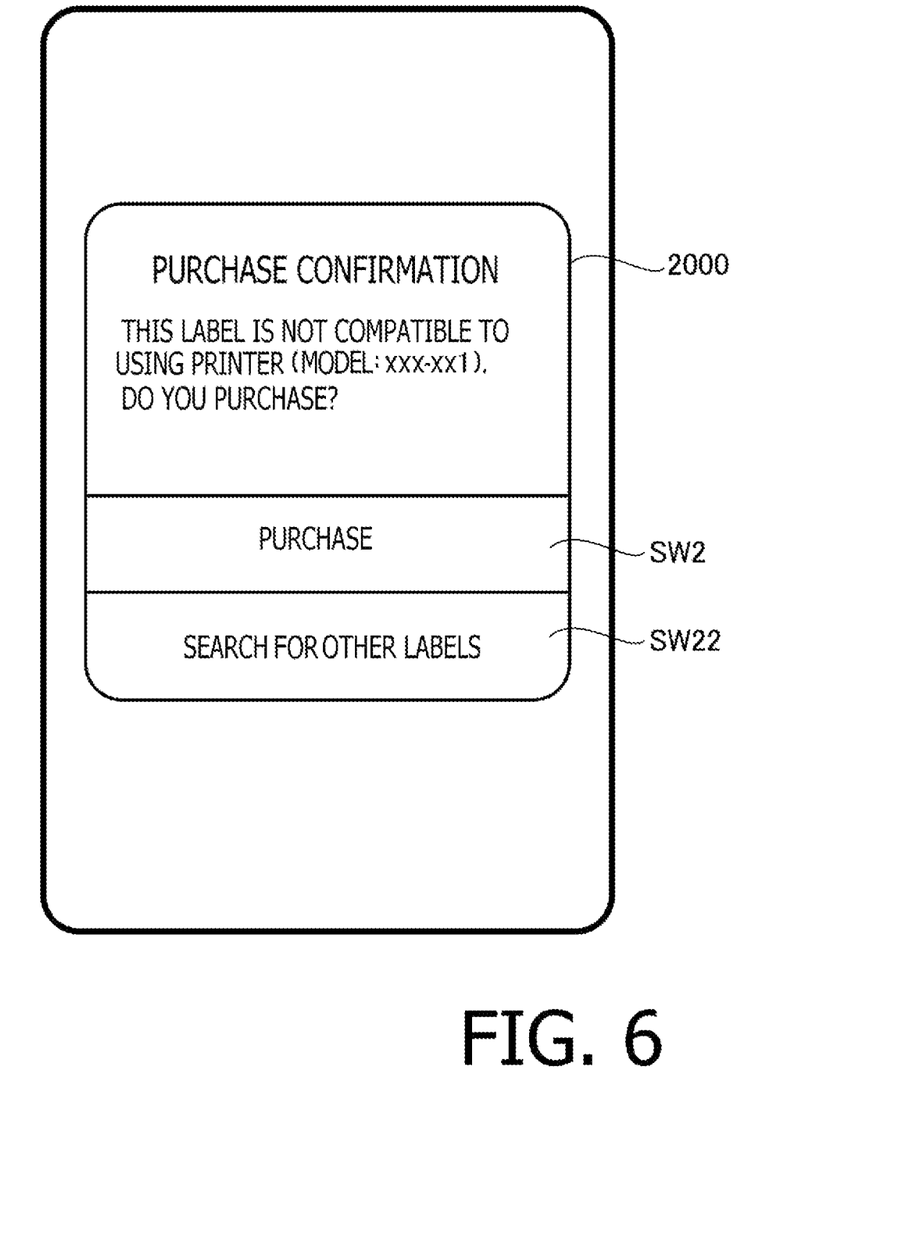
FIG. 6 shows an example of a purchase confirmation screen.

FIG. 6 shows an example of the purchase confirmation screen 2000. On the purchase confirmation screen 2000, a message informing the user that the tape cartridge he/she is about to purchase is not compatible with the model of the printer 100A used by the mobile terminal 10, a purchase instruction button SW21 and a re-search instruction button SW22 that instructs the consumable-purchasing mini-app 3 to search for other labels compatible with the printer 100A are displayed.

As shown in FIG. 5, when receiving the operation of the purchase instruction button SW21 via the user IF 13, the consumable-purchasing mini-app 3 determines that a tape cartridge of "Label B," which is not suitable for the printer 100A, is to be purchased (alt: purchase). In this case, the consumable-purchasing mini-app 3 causes the user IF 13 to display a non-compatible consumable-purchasing page for receiving the purchasing instruction to purchase a tape cartridge with "Label B" (arrow B31).

For example, when the purchaser U purchases the new printer 100B to which the tape cartridge of "Label B" can be attached, or when the mobile terminal 10 has never used the printer 100B before, the consumable-purchasing mini-app 3 cannot obtain the printer information including the model information "xxx-xx4" of the printer 100B from the printing app 42, or the like. In this case, the consumable-purchasing mini-app 3 displays the purchase confirmation screen 2000 shown in FIG. 6 on the user IF 13. According to such a configuration, by operating the purchase instruction button SW21, the purchaser U can purchase the tape cartridge with a recognition that the tape cartridge he/she intends to purchase is one with "Label B" which is not compatible with the model of the printer 100A. In other words, such a configuration is convenient for the purchaser U since he/she can purchase consumables for the printer 100B he/she is going to purchase, or even consumables requested to be purchased by someone else.

On the other hand, when the consumable-purchasing mini-app 3 receives the operation of the re-search instruction button SW22 via the user IF 13, the consumable-purchasing mini-app 3 determines not to purchase the tape cartridge of "Label B" that is not suitable for the printer 100A (alt: not purchase). In this case, the consumable-purchasing mini-app 3 generates a quasi-list of consumables that are substitutable for the consumables identified by the identifying information contained in the startup information and that are compatible with the printer 100A indicated by the obtained model information (arrow B32).

In other words, the consumable-purchasing mini-app 3 reads the model information "xxx-xxx" from the printer information obtained from the printing app 42 at arrow A22, and checks the model information against the consumable DB 4 shown in FIG. 2. The consumable-purchasing mini-app 3 extracts the consumables associated with the model information "xxx-xx1" from the consumable DB 4. The consumable-purchasing mini-app 3 further extracts, from the extracted consumables, consumables (i.e., tape cartridges) with the same attribute as the attributes of the consumables (i.e., the "Label B" cartridges) indicated by the identifying information. The consumable-purchasing mini-app 3 lists the consumables extracted in this way to generate the quasi-list. That is, the consumable-purchasing mini-app 3 generates a list of tape cartridges that are compatible with the printer 100A purchased by the purchaser U.

The consumable-purchasing mini-app 3 transmits the generated quasi-list to the management server 300 (arrow B33). The management server 300 extracts the page information 6 based on the quasi-list and transmits the extracted page information 6 to the consumable-purchasing mini-app 3 (arrow B34). The consumable-purchasing mini-app 3 displays a purchase procedure screen using the page information 6 (arrow B35).

Figure 7:
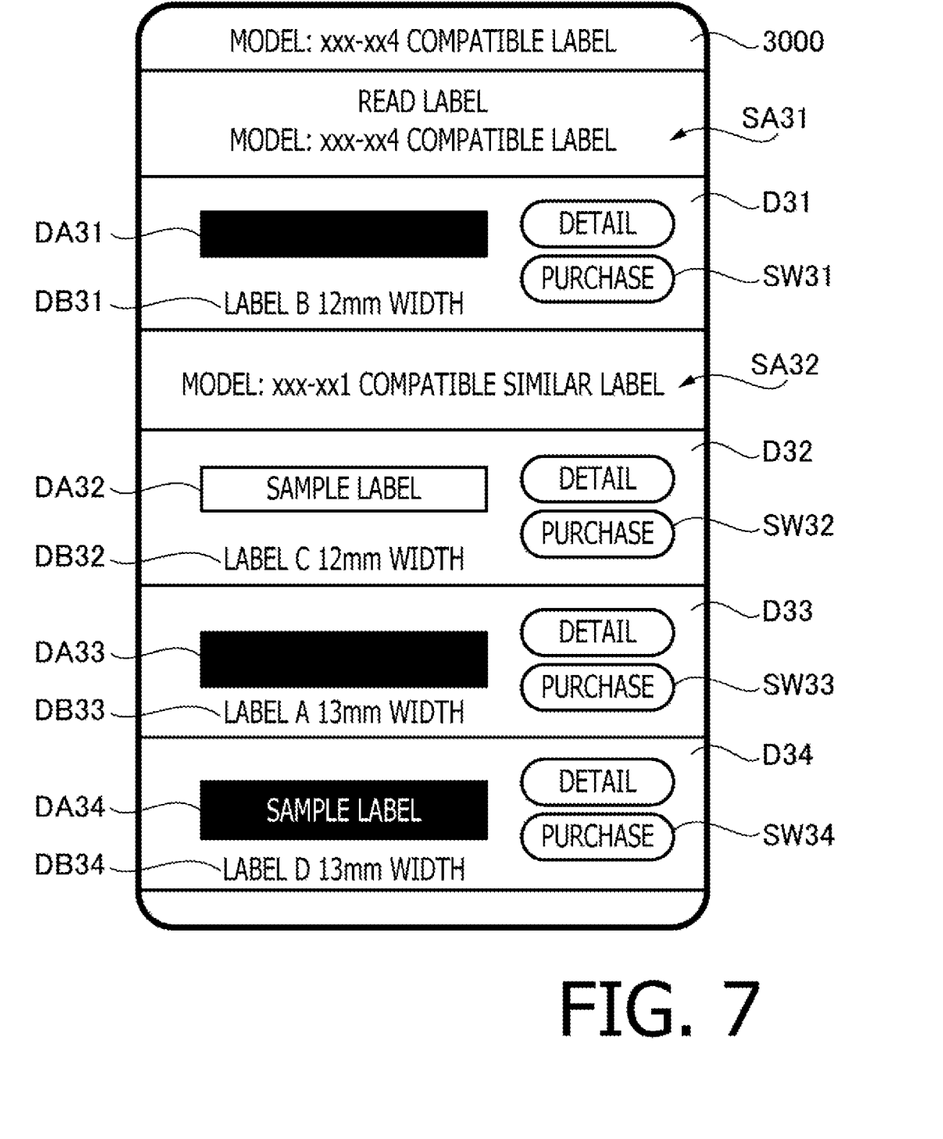
FIG. 7 shows an example of a purchase procedure screen.

FIG. 7 shows an example of a purchase procedure screen 3000. The purchase procedure screen 3000 includes a display area SA31 for displaying consumables indicated by the identifying information read from the QR code 5 and a display area SA32 for displaying consumables contained in the quasi-list. In the display area SA32, only the consumables having the same attributes as the consumables indicated by the identifying information are displayed.

In the present embodiment, the tape cartridge of "Label B" identified by the identifying information is displayed in the display area SA31. In the display area SA32, the tape cartridges of "Label C," "Label A," and "Label D" compatible with the model of the printer 100A model indicated by the obtained printer information are displayed. The "cleaning sheet K"and "replacement cutter P" are also consumables that is compatible with the model of the printer 100A model, but the "Label C," "Label A," and "Label D" tape cartridges have different attributes from "Label B" tape cartridges, and therefore the "cleaning sheet K" and "replacement cutter P" are not displayed in the display area SA32.

In the display fields D31, D32, D33 and D34, sample images DA31, DA32, DA33 and DA34, product summary explanations DB31, DB32, DB33 and DB34 and purchase instruction buttons SW31, SW32, SW33 and SW34 are displayed, respectively. With the above configuration, the purchaser U can easily select a tape cartridge that is similar to "Label B" and is also compatible with the printer 100A. Since the purchase confirmation is made on the purchase confirmation screen 2000, the purchase instruction button SW31 in the display area SA31 may be omitted.

As shown in FIG. 5, the purchaser U, for example, operates the purchase instruction button SW32 on the purchase procedure screen 3000 via the user IF 13 to select the "Label C"tape cartridge (arrow B36). The consumable-purchasing mini-app 3 receives the purchase instruction from the purchaser U to purchase a "Label C" tape cartridge by receiving an operation of the purchase instruction button SW32 (arrow A52) and performs the purchasing process (arrow A53).

The consumable-purchasing mini-app 3 can receive the purchase instruction (arrow A52) through the specific product purchasing page indicated by arrow B11 and the non-compatible product purchasing page indicated by arrow B31 (arrow A52), and can perform the purchase procedure (arrow A53). The processes indicated by arrows B11 through B36 and arrows A52 to arrow A53 are examples of a "specific purchasing process."

As described above, according to the second embodiment, when the QR code 5 attached to a consumable is scanned to start the consumable-purchasing mini-app 3, the identifying information of the consumable item to which the QR code is assigned is included in the startup information contained in the QR code 5. The consumable-purchasing mini-app 3 determines whether or not the consumable identified by the identifying information is suitable for the printer 100A of the purchaser U based on the identifying information contained in the startup information and the printer information of the printer 100A obtained from the printing app 42. When determining that the consumable identified by the identifying information is suitable for the printer 100A of the purchaser U, the consumable-purchasing mini-app 3 enables the purchase of the consumable. As a result, the purchaser U is more likely to be able to purchase the consumables suitable for the printer 100A that the purchaser owns.

Third Embodiment

Figure 8:
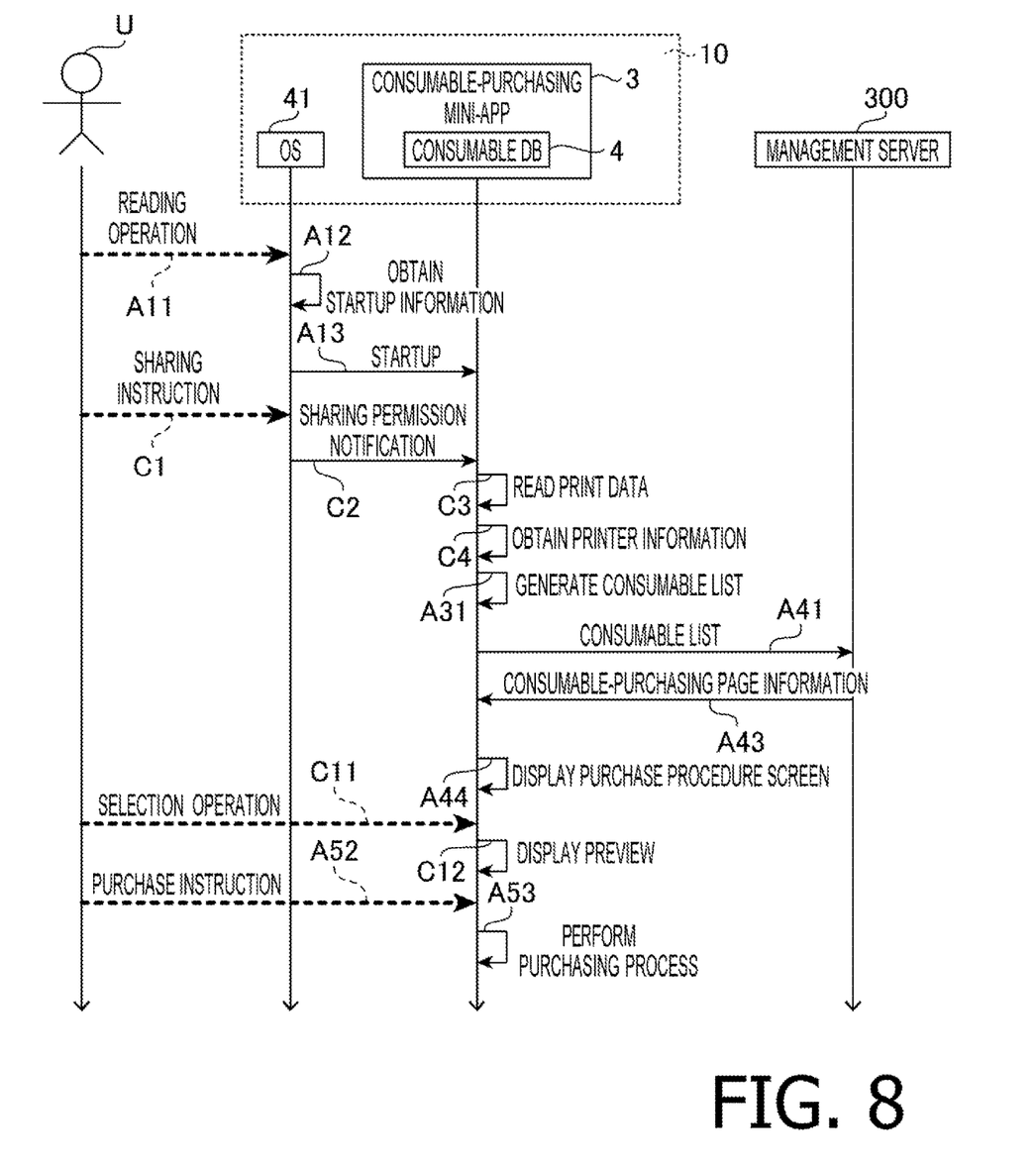
FIG. 8 is a sequence chart illustrating a control procedure of a consumable-purchasing process when purchasing consumables using a consumable-purchasing mini-app according to a third embodiment.

Next, a program according to a third embodiment which is realized by computer-executable instructions contained in the memory 32 which is an example of a non-transitory computer-readable recording medium will be described. FIG. 8 is a sequence diagram showing a control procedure of a consumable purchasing process for purchasing consumables using the consumable purchasing mini-app 3 according to the third embodiment. The present embodiment differs from the first embodiment in that the consumable-purchasing mini-app 3 obtains printer information from the print data and displays a preview of the print data. In the following, the description will focus on the configuration that differs from the first embodiment, and the same symbols as in the first embodiment will be used for configurations that are common to the first embodiment, and descriptions will be omitted as appropriate.

The mobile terminal 10 is configured to store, for example, print data output by the printing app 42 or print data generated by other devices in the memory 32. Print data is data that, when passed to a printer, enables the printer to print the content represented by the print data. The print data contains printer information as well as the content to be printed and printing parameters.

With the consumable-purchasing mini-app 3 is started up (arrow A11 to arrow A13), the purchaser U inputs a sharing instruction to share print data via the user IF 13 (arrow C1). Then the OS 41 permits the sharing of the print data and issues a sharing permission notification indicating that the sharing is permitted (arrow C2).

Upon detecting the sharing permission notification issued by the OS 41, the consumable-purchasing mini-app 3 reads the print data that is permitted to be shared from the memory 32 (arrow C3) and obtains printer information from the read print data (arrow C4). The process shown by arrows C3 to C4 is an example of a "printer information obtaining process."

The consumable-purchasing mini-app 3 checks the printer information obtained from the print data against the consumable DB 4 to generate the consumable list and displays the purchase procedure screen via the user IF 13 (arrows A31 and A44).

When receiving the selection operation to select a consumable product from the consumables displayed on the purchase procedure screen via the user IF 13 (arrow C11), the consumable-purchasing mini-app 3 causes the user IF 13 to display a preview screen that allows the purchaser U to preview an image when the print data read from the memory 32 is printed using the selected consumables (arrow C12). The processes of arrows C11 to C12 are an example of the "preview process."

Figure 9:
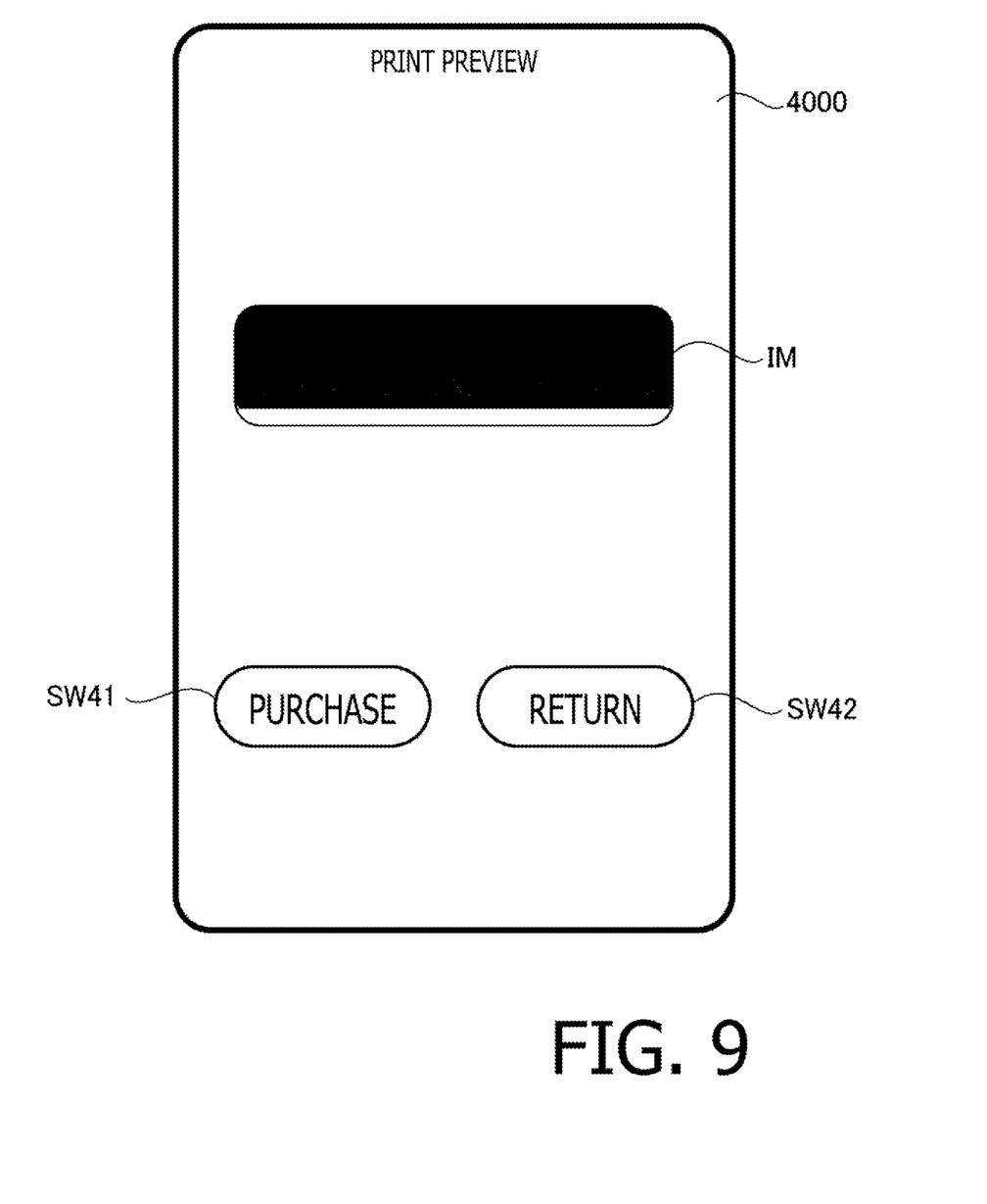
FIG. 9 shows an example of a preview screen.

FIG. 9 shows an example of a preview screen 4000. On the preview screen 4000, a preview image IM, a purchase instruction button SW41 that receives a purchase instruction, and a return button SW42 that receives an instruction to return to the purchase procedure screen are displayed. When, for example, the purchaser U purchases a tape cartridge of which the printing tape has a gradation pattern, the consumable-purchasing mini-app 3 causes the user IF 13 to display the preview image IM, which is a composite of the image showing the printing tape and an image of the text "No Smoking," which is the content shown in the print data. The purchaser U can check the preview image IM and determine whether or not to purchase the tape cartridge before concluding the purchase procedure.

Assuming, for example, that in the preview image IM, the text "No Smoking" is difficult to view because it overlaps the gradient pattern of the printing tape, or that the text "No Smoking" protrudes from the tape. In such a case, the purchaser U can go back to the preview screen 4000 and re-display the purchase procedure screen by tapping the back button SW42 on the preview screen 4000 and select a tape cartridge again. On the other hand, when the purchaser U taps the purchase instruction button SW41 on the preview screen 4000, as shown in FIG. 8, the consumable-purchasing mini-app 3 receives the purchase instruction and performs the purchasing process with respect to the tape cartridge (arrows A52 to A53). As the preview screen 4000 is displayed on the mobile terminal 10, the purchaser U can consider whether the consumable is to be really purchased when selecting the consumable.

As described above, in the mobile terminal 10 on which the third embodiment of the consumable-purchasing mini-app 3 is downloaded, the print data stored in the mobile terminal is likely to be suitable for the printer 100A used by the owner of the mobile terminal 10. Therefore, when that print data is set to be shared, the consumable-purchasing mini-app 3 obtains printer information from the print data. Consequently, possibility that the purchaser U is able to select the correct consumables for the printer 100A owned by the purchaser U can be increased.

The embodiment is merely an example and does not limit the present disclosures in any way. Therefore, the present disclosures can naturally be improved and/or transformed in various ways within the scope of the present disclosures. For example, in the above embodiment, the mobile terminal 10 is referred to as an example of a device, but a stationary information processing device such as a desktop type PC may be regarded as an example of a "device." Although the label writer is referred to as an example of a printer, a model different from the label writer, such as an inkjet printer, a laser printer, or a multifunction printer, may also be regarded as an example of the printer. In addition, consumables may include ink and/or toner cartridges, cut sheets, and the like.

Figure 10:
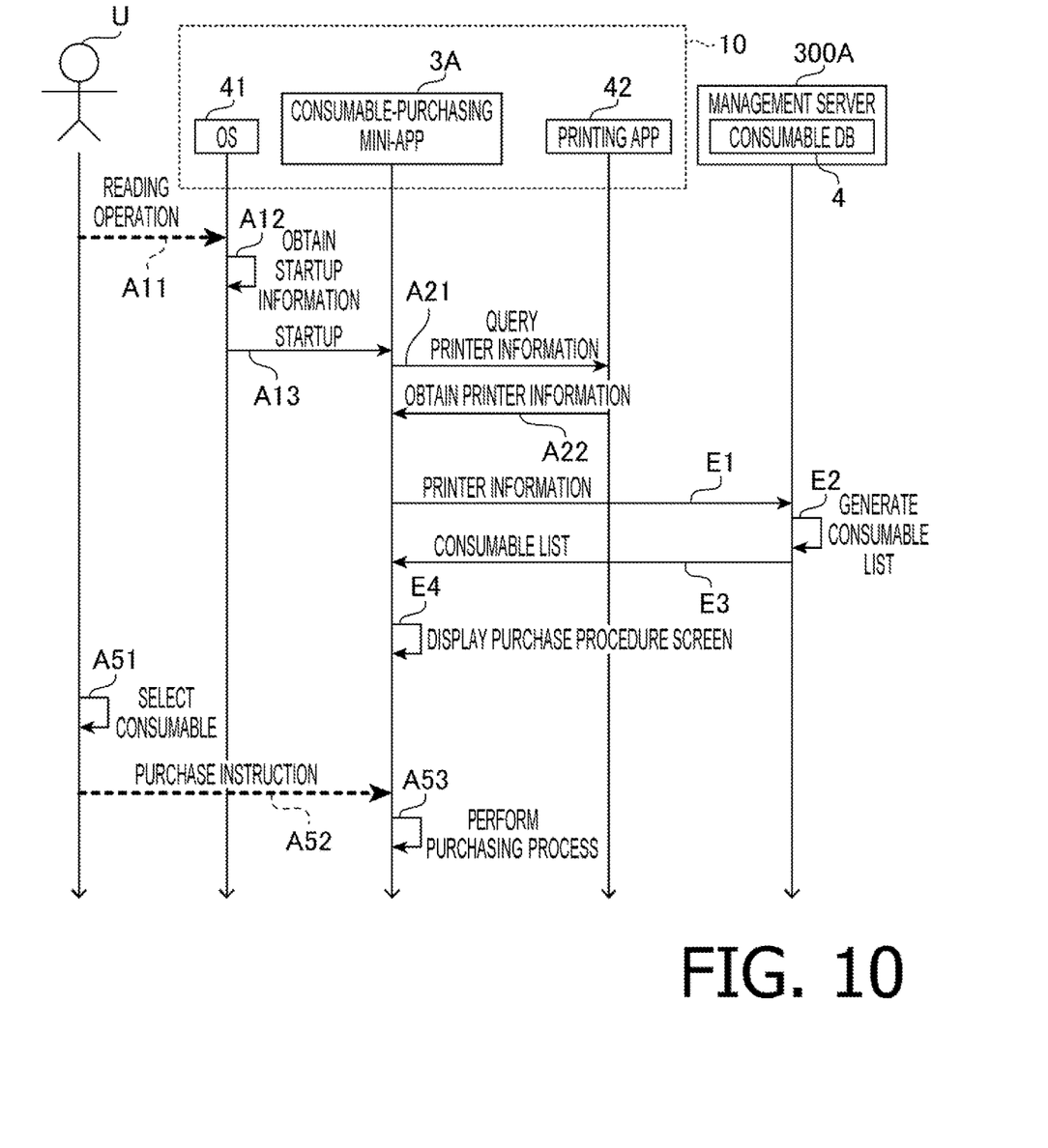
FIG. 10 is a sequence chart illustrating a control procedure of a consumable-purchasing process executed in a modification of a consumable-purchasing system.

As shown in FIG. 10, a consumable DB 4 may be provided to a management server 300A, while a consumable-purchasing mini-app 3A may not store the consumable DB 4. In such a case, the consumable-purchasing mini-app 3A transmits the obtained printer information to the management server 300A via the communication IF 12 (arrow E1), and the management server 300A may generate the consumable list (arrow E2). Then, the consumable-purchasing mini-app 3A receives the consumable list generated by the management server 300A therefrom via the communication IF 12 (arrow E3) and causes the user IF 13 to display the purchase procedure screen (arrow E4).

It is noted that, in a way similar to obtain the consumable list, the management server 300A may generate the quasi-list and the consumable-purchasing mini-app 3A may be configured to obtain the quasi-list from the management server 300A. The quasi-list is a list generated when the startup information includes parameters of the identifying information indicating particular consumables, and the consumables indicated by the identifying information and the printer indicated by the printer information is not compatible with each other. In this way, by managing the information on consumables on the management server 300A, new consumables can be added to the consumables list and/or the quasi-list without changing the consumable-purchasing app 2 or the consumables-purchasing mini-app 3. As shown in A31 in FIG. 3, when the consumable-purchasing mini-app 3 has the consumable DB 4 and is configured to manage consumables by itself, it is not necessary to access the management server 300A when generating the consumables list, and it is expected that the consumables list can be obtained earlier.

It is noted that a parameter indicating the printer information may be added, for example, to the startup information contained in the QR Code 5. When obtaining the startup information, the consumable-purchasing mini-app 3 obtains the printer information from the parameter added to the startup information, and the process of arrows A21 to A22 in FIG. 3 may be omitted. In such a case, the possibility of the appropriate consumables for the printer indicated by the printer information contained in the startup information being selected is increased. As shown by arrows A21 to A22 in FIG. 3, when the consumable-purchasing mini-app 3 obtains the printer information from the printing app 42 running on the mobile terminal 10, the possibility of the appropriate consumables for the printer owned by the purchaser being selected is increased.

When the printing app 42 generates and stores a print history that includes printer information each time a print job is output to the printer, then in arrows A21 to A22 in FIG. 3, the consumable-purchasing mini-app 3 may read the print history from printing app 42 and obtain the printer information from the print history. In such a case, the consumable list would be generated based on the actual printing, thereby increasing the possibility that the suitable consumables are selected for the printer that the purchaser U owns.

The consumable-purchasing mini-app 3 may be configured to hold the page information 6 and generate the purchase procedure screen without accessing the management server 300. However, as shown by arrows A41 to A44 in FIG. 3, when the management server 300 holds the page information 6 and the consumable-purchasing mini-app 3 transmits the consumable list to the management server 300 to obtain the page information 6 from the management server 300, the memory capacity of the memory 32 of the mobile terminal 10 is not oppressed by the page information 6. Further, it will also become possible to display sample images, descriptions, and other information regarding the latest consumables without having to change the consumable-purchasing mini-app 3.

In the determination process indicated by arrow B11 in FIG. 5, when the consumable-purchasing mini-app 3 determines that a consumable indicated by the identifying information is not compatible with the printer indicated by the printer information obtained from the printing app 42 (alt: unsuitable), the consumable-purchasing mini-app 3 may be configured not perform the process of B21 to B36, thereby not receiving the purchase instruction. According to such a configuration, the risk of purchasing a consumable that does not match the printer owned by the purchaser U can be reduced.

It is possible to omit the process shown by arrows B32 to B36 in FIG. 5 not to generate the quasi-list when a non-compatible product is not purchased so that the purchase procedure screen 3000 displaying similar products is not displayed. However, the process shown by arrows B32 to B36 in FIG. 5 would make it more likely that the purchaser U purchases consumables that are similar to non-compatible items and compatible with the printer 100A that he/she owns.

In any flowchart disclosed in the embodiment, multiple processes in any number of steps can be arbitrarily changed in the order of execution or executed in parallel to the extent that there is no conflict in the processing content.

The processes disclosed in the embodiment may be performed by a single CPU, multiple CPUs, hardware such as ASICs, or a combination thereof. The processes disclosed in the embodiments can be realized in various ways, such as a non-transitory computer-readable recording medium containing computer-executable instructions realizing a program for executing the process, or a method.

What is claimed is:

1. A non-transitory computer-readable storage medium for a device having a computer, the non-transitory computer-readable storage medium containing computer-executable instructions realizing a consumable purchasing program used to purchase consumables, the consumable purchasing program being a program providing part of functions of a full application, the consumable purchasing program being a program that does not require installation on the device, the consumable purchasing program being erased from the device after a predetermined amount of time has elapsed, the consumable purchasing program being to be downloaded to the device and started up by the device reading startup information of the consumable purchasing program, the full application being a program that requires installation on the device, wherein the consumable purchasing program causes, when executed by the computer, the device to perform:
a printer information obtaining process of obtaining printer information of a printer used by the device, the printer information being information usable by an other program different from the consumable purchasing program, the printer information being shared by the other program and the consumable purchasing program;
a list obtaining process of obtaining a list of consumables compatible with the printer indicated by the printer information obtained in the printer information obtaining process; and
a purchasing process of receiving a purchasing instruction to purchase a consumable included in the list of consumables and performing a purchase procedure of the consumable when receiving the purchasing instruction.

2. The non-transitory computer-readable storage medium for the device according to claim 1,
wherein, in the list obtaining process, the device is configured to transmit the obtained printer information to a server, and obtain the list of consumables by receiving the list of consumables from the server, the server storing the printer information associated with information indicating information indicating consumables compatible with the printer indicated by the printer information, the sever being configured to, when receiving the printer information from the device from the device, read the information indicating the consumables, which is associated with the received printer information, and generate the list of consumables based on the read information indicating the consumables to response to the device.

3. The non-transitory computer-readable storage medium for the device according to claim 1,
wherein the consumable purchasing program stores the printer information and information indicating a consumable compatible with the printer indicated by the printer information in an associated manner, and
wherein, in the list obtaining process, the device is configured to read the information indicating the consumable associated with the obtained printer information, and generate the list of consumables based on the read information indicating the consumable to obtain the list of consumables.

4. The non-transitory computer-readable storage medium for the device according to claim 1,
wherein, in the printer information obtaining process, the device is configured to obtain, as the printer information from the other program, printer information indicating a printer which is registered as a printer to be used, the other program being a program configured to control a printer, printer information indicating a printer to be used being registered to the other program.

5. The non-transitory computer-readable storage medium for the device according to claim 1,
wherein, in the printer information obtaining process, the device is configured to read a print history from the other program, and obtain the printer information included in the read print history, the other program being a program configured to control a printer, the other program stores the print history including the printer information indicating a printer which has been used to print each time a print job is output to the printer.

6. The non-transitory computer-readable storage medium for the device according to claim 1,
wherein, in the printer information obtaining process, the device is configured to detect notification that sharing of the printer information including print data is permitted, read the print data that the notification is detected, and obtain the printer information from the read print data.

7. The non-transitory computer-readable storage medium for the device according to claim 6,
wherein the consumable purchasing program causes, when executed by the computer, the device to perform, in a state where one of the consumables listed in the list of consumables is selected, a preview process of displaying a preview image when printing is executed using the selected consumable based on the print data that the printer information is obtained.

8. The non-transitory computer-readable storage medium for the device according to claim 1,
wherein a parameter indicating the printer information is assignable to the startup information used to start up the consumable purchasing program, and
wherein, in the printer information obtaining process, the device is configured to obtain the printer information from the parameter assigned to the startup information when the parameter indicating the printer information is assigned to the startup information.

9. The non-transitory computer-readable storage medium for the device according to claim 1,
wherein a parameter indicating identifying information is assignable to the startup information used to start up the consumable purchasing program, the identifying information identifying a consumable, and
wherein the consumable purchasing program causes, when executed by the computer, the device to perform a specific purchasing process of:
determining, when a parameter indicating the identifying information is assignable to the startup information, whether the consumable identified by the identifying information that the parameter is assigned is compatible with the printer indicated by the obtained printer information;
receiving the purchasing instruction to purchase the consumable identified by the identifying information when the consumable compatible with the printer indicated by the obtained printer information;
executing the purchasing process when receiving the purchasing instruction; and
notifying that the consumable is not compatible with the printer when the consumable is not compatible with the printer indicated by the obtained printer information.

10. The non-transitory computer-readable storage medium for the device according to claim 9,
wherein, when the consumable identified by the identifying information that the parameter is assigned is not compatible with the printer indicated by the obtained printer information, the device is configured to, in the specific purchasing process, notify that the consumable is not compatible with the printer, and not to receive the purchasing instruction to purchase the consumable identified by the identifying information.

11. The non-transitory computer-readable storage medium for the device according to claim 9,
wherein, when the consumable identified by the identifying information that the parameter is assigned is not compatible with the printer indicated by the obtained printer information, the device is configured to, in the specific purchasing process, obtain a quasi-list of consumables compatible with the printer identified by the obtained printer information among similar products similar to the consumable identified by the identifying information, and receive a purchasing instruction to purchase a consumable listed in the quasi-list of consumables.

12. A non-transitory computer-readable storage medium for a device having a computer, the non-transitory computer-readable storage medium containing computer-executable instructions realizing a consumable purchasing program used to purchase consumables, the consumable purchasing program being a program providing part of functions of a full application, the consumable purchasing program being a program that does not require installation on the device, the consumable purchasing program being erased from the device after a predetermined amount of time has elapsed, the consumable purchasing program being to be downloaded to the device and started up by the device reading startup information of the consumable purchasing program, the full application being a program that requires installation on the device, a parameter indicating identifying information is assignable to the startup information, the identifying information identifying a consumable, wherein the consumable purchasing program causes, when executed by the computer, the device to perform a specific purchasing process of:

determining, when a parameter indicating the identifying information is assignable to the startup information, whether the consumable identified by the identifying information that the parameter is assigned is compatible with the printer indicated by the obtained printer information;

receiving the purchasing instruction to purchase the consumable identified by the identifying information when the consumable is compatible with the printer indicated by the obtained printer information;

executing the purchasing process when receiving the purchasing instruction; and notifying that the consumable is not compatible with the printer when the consumable is not compatible with the printer indicated by the obtained printer information.

\* \* \* \* \*